United States Patent
Hydro et al.

(10) Patent No.: US 12,282,579 B2
(45) Date of Patent: Apr. 22, 2025

(54) PERFORMING ACTIONS ON PERSONAL DATA STORED IN MULTIPLE DATABASES

(71) Applicant: Pilot Travel Centers LLC, Knoxville, TN (US)

(72) Inventors: Greg Hydro, Knoxville, TN (US); John Mardini, Knoxville, TN (US); Adam Neubauer, Knoxville, TN (US)

(73) Assignee: PILOT TRAVEL CENTERS, LLC, Knoxville, TN (US)

( * ) Notice: Subject to any disclaimer, the term of this patent is extended or adjusted under 35 U.S.C. 154(b) by 227 days.

(21) Appl. No.: 17/096,326

(22) Filed: Nov. 12, 2020

(65) Prior Publication Data
US 2021/0141929 A1 May 13, 2021

Related U.S. Application Data

(60) Provisional application No. 62/934,051, filed on Nov. 12, 2019.

(51) Int. Cl.
*G06F 21/62* (2013.01)
*G06F 16/951* (2019.01)

(52) U.S. Cl.
CPC ........ *G06F 21/6245* (2013.01); *G06F 16/951* (2019.01); *G06F 21/6227* (2013.01)

(58) Field of Classification Search
CPC . G06F 21/6245; G06F 16/951; G06F 21/6227
See application file for complete search history.

(56) References Cited

U.S. PATENT DOCUMENTS

| | | | | |
|---|---|---|---|---|
| 6,078,914 A * | 6/2000 | Redfern | ............... | G06F 16/3334 707/999.005 |
| 6,266,668 B1 * | 7/2001 | Vanderveldt | ........ | G06F 16/9535 |
| 6,532,459 B1 * | 3/2003 | Berson | ................... | G06F 16/951 |
| 8,856,937 B1 * | 10/2014 | Wuest | ..................... | G06F 21/56 713/188 |
| 9,342,553 B1 * | 5/2016 | Fuller | .................... | G06F 16/245 |
| 10,467,434 B2 * | 11/2019 | Smyth | ................... | H04L 63/105 |
| 10,469,248 B2 * | 11/2019 | Chalakudi | ........... | H04L 63/0435 |

(Continued)

OTHER PUBLICATIONS

Hazim Almuhimedi, Shomir Wilson, Bin Liu, Norman Sadeh, and Alessandro Acquisti. 2013. "Tweets are forever: a large-scale quantitative analysis of deleted tweets". In Proceedings of the 2013 conference on Computer supported cooperative work. ACM, 897-908 (Year: 2013).*

(Continued)

*Primary Examiner* — Han Yang
(74) *Attorney, Agent, or Firm* — Seth L. Hudson; Maynard Nexsen PC

(57) ABSTRACT

Systems and method for performing privacy actions on data records are provided. In one implementation, a method includes receiving a request from a client to perform a privacy action with respect to data records associated with the client. The method also includes using a crawler tool to find the data records appearing throughout the network in one or more data sources. Also, the method includes querying the one or more data sources to determine whether the one or more data sources are legitimate and whether the data still exists on the one or more data sources and then performing the privacy action on the data records.

20 Claims, 7 Drawing Sheets

(56) References Cited

U.S. PATENT DOCUMENTS

| | | | | |
|---|---|---|---|---|
| 10,659,219 | B1* | 5/2020 | Ganeshmani | H04L 9/14 |
| 11,182,500 | B2* | 11/2021 | Murray | G06F 16/958 |
| 11,704,431 | B2* | 7/2023 | Kraus | H04L 63/0414 |
| | | | | 726/26 |
| 2003/0217060 | A1* | 11/2003 | Stockton | G06F 16/951 |
| 2005/0080780 | A1* | 4/2005 | Colledge | G06F 16/951 |
| 2006/0206370 | A1* | 9/2006 | Skopal | G06Q 10/06 |
| | | | | 718/102 |
| 2009/0132419 | A1* | 5/2009 | Grammer | G06F 21/6245 |
| | | | | 705/50 |
| 2014/0304713 | A1* | 10/2014 | Olsson | G06F 9/5072 |
| | | | | 718/106 |
| 2015/0081654 | A1* | 3/2015 | Spangler | G06F 16/3325 |
| | | | | 707/723 |
| 2018/0137179 | A1* | 5/2018 | Kawanabe | G06Q 10/10 |
| 2018/0332118 | A1* | 11/2018 | Phipps | G10L 15/18 |
| 2018/0332138 | A1* | 11/2018 | Liu | H04L 41/5041 |
| 2019/0188327 | A1* | 6/2019 | Bastide | G06F 16/9535 |
| 2019/0286501 | A1* | 9/2019 | Karchov | H04L 41/026 |
| 2019/0318350 | A1* | 10/2019 | Hinkel | H04L 9/3247 |
| 2019/0372770 | A1* | 12/2019 | Xu | H04L 9/0643 |
| 2020/0042361 | A1* | 2/2020 | Clark | G06N 20/00 |
| 2020/0065736 | A1* | 2/2020 | Relangi | G06N 20/20 |
| 2020/0117737 | A1* | 4/2020 | Gopalakrishnan | |
| | | | | G06F 16/9535 |
| 2020/0125766 | A1* | 4/2020 | Yang | H04L 9/50 |
| 2020/0372172 | A1* | 11/2020 | Murray | G06F 16/9024 |
| 2021/0089538 | A1* | 3/2021 | Rooney | G06F 16/2282 |

OTHER PUBLICATIONS

Li, Y., Vishwamitra, N., Knijnenburg, B. P., Hu, H., & Caine, K. (2017). "Effectiveness and users' experience of obfuscation as a privacy-enhancing technology for sharing photos". Proceedings of the ACM on Human-Computer Interaction, 1(CSCW), 1-24 (Year: 2017).*

Mai L, Rupprecht L, Alim A, Costa P, Migliavacca M, Pietzuch P, Wolf AL. "Netagg: Using middleboxes for application-specific on-path aggregation in data centres". In Proceedings of the 10th ACM International on Conference on emerging Networking Experiments and Technologies Dec. 2, 2014 (pp. 249-262) (Year: 2014).*

* cited by examiner

PERFORMING ACTIONS ON PERSONAL DATA STORED IN MULTIPLE DATABASES

CROSS REFERENCE TO RELATED PATENT APPLICATION

The present application claims the benefit of priority to U.S. Provisional Patent Application No. 62/934,051, filed on Nov. 12, 2019, and entitled "PERFORMING ACTIONS ON PERSONAL DATA STORED IN MULTIPLE DATABASES," the contents of which are incorporated in full by reference herein.

TECHNICAL FIELD

The present disclosure generally relates to a privacy platform. More particularly, the present disclosure relates to accumulating data from diverse data databases and accessing the data to perform various privacy functions on the data.

BACKGROUND

Generally, a customer relationship and service management system includes a unitary set of databases that may be used to assist a client with a particular online service. However, a client may wish to perform certain functions that may include databases spread out in various networks and are not accessible on one specific platform. Therefore, there is a need in the field of system networks to provide a network of diverse databases allowing a client to perform operations on data records stored in various locations in a network and to perform these operations under a single data platform.

SUMMARY

The present disclosure is directed to various embodiments for performing privacy actions on personal data that is a stored in multiple databases throughout a network. These privacy actions may include accessing private data, obfuscating and/or deleting private data, determining any risks of performing actions on the data, and other actions. Accordingly, several example embodiments are described in the summary and further described in the detailed description. Note, that customer relationship management (CRM), service management system (SMS), a data management system, and case management system are used interchangeably within the example embodiments, and though distinctions are involved in the various management systems the various embodiments are capable of interchanging within the various systems.

According to one implementation of the present disclosure, a method may include receiving a request from a client to perform a privacy action with respect to data records associated with the client. The method may also include the step of using a crawler tool to find the data records appearing throughout the network in one or more data sources. Also, the method may include querying the one or more data sources to determine whether the one or more data sources are legitimate and whether the data still exists on the one or more data sources and performing the privacy action on the data records.

According to another implementation, the case management system includes a processing device and a memory device configured to store instructions. When executed, the instructions may be configured to enable the processing device to receive, via a network interface, a request from a client to perform a privacy action with respect to data records associated with the client. The instructions also enable the processing device to use a crawler tool to find the data records appearing throughout a network in one or more data sources and query the one or more data sources to determine whether the one or more data sources are legitimate and whether the data still exists on the one or more data sources. Also, the processing device may perform the requested privacy action on the data records.

According to yet another implementation, a non-transitory computer-readable medium for storing computer logic is provided. The computer logic may include instructions for causing a processing device to receive a request from a client to perform a privacy action with respect to data records associated with the client and use a crawler tool to find the data records appearing throughout the network in one or more data sources. The instructions may also cause the processing device to query the one or more data sources to determine whether the one or more data sources are legitimate and whether the data still exists on the one or more data sources and perform the privacy action on the data records.

BRIEF DESCRIPTION OF DRAWINGS

The present disclosure generally relates to a computer implemented privacy platform. More particularly, the present disclosure relates to accumulating data from diverse data platforms and accessing the data to perform various functions on the data.

DETAILED DESCRIPTION

The present disclosure relates to systems and methods for enabling a client to access data that may be present in any of a number of diverse databases and performing various actions on the data. The data may include sensitive or private information about the client that normally requires proper handling. For example, some private information, such as names and addresses, may be stored in different databases throughout a network (e.g., the Internet, LAN, WAN). If a person wishes to delete this information, such as to reduce the risk of hacking, receiving robocalls, etc., the person may request that this information is handled sensitively. The systems and methods of the present disclosure are configured to search for one or more occurrences of the privacy data stored in the network (e.g., on multiple databases) and perform any requested privacy actions. For example, a client may request that the data simply be accessed or updated in one step without the need to access the multiple databases. Also, the client may request that the date be obfuscated and/or deleted. The example embodiments described herein provide various privacy actions to be performed on personal data in accordance with a client request to the computing system.

Figure 1:
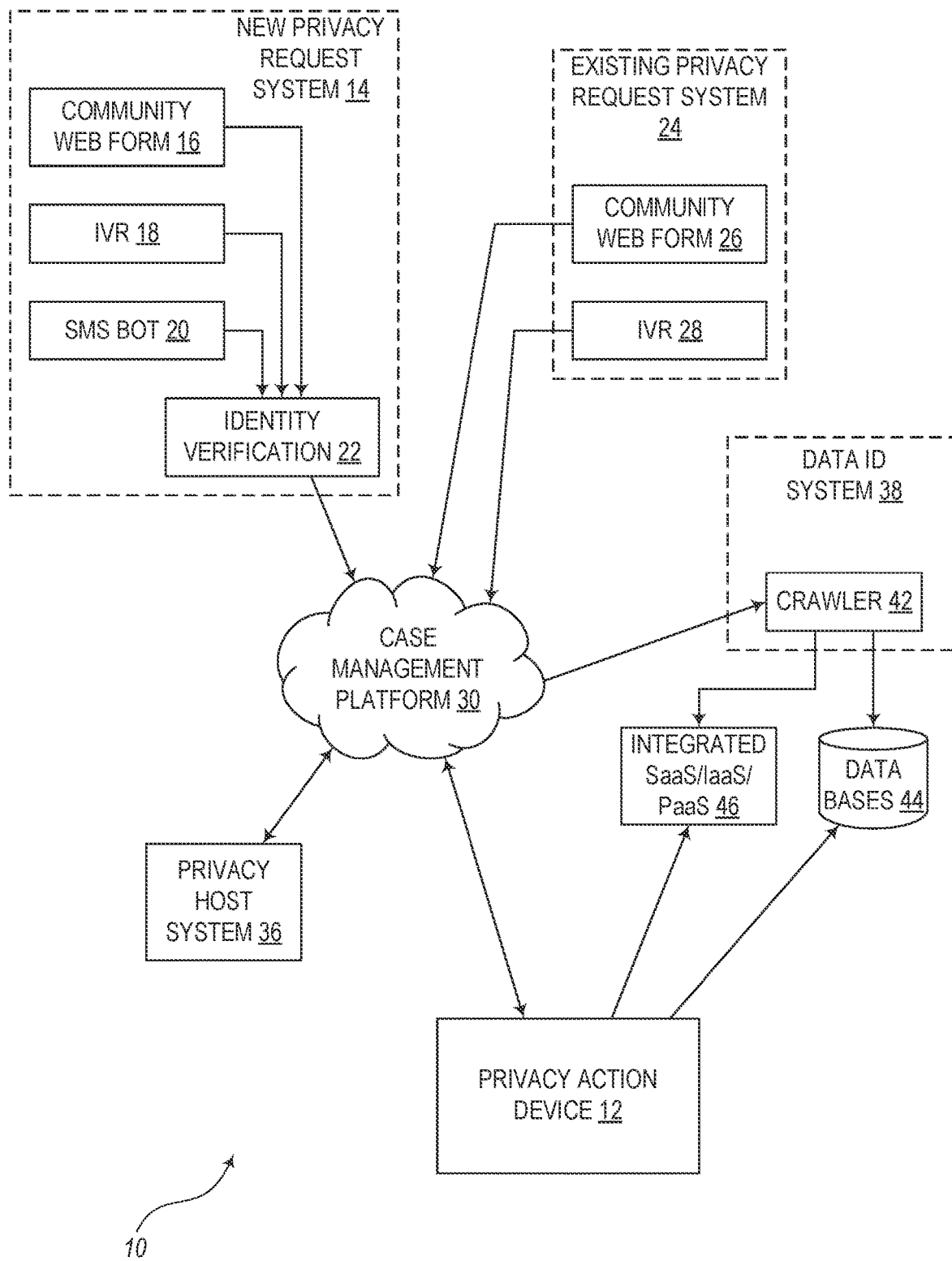
FIG. 1 is a block diagram illustrating a privacy management system, according to various embodiments.

We begin our discussion with FIG. 1, which illustrates a schematic diagram of an example embodiment of a privacy management system 10 also known as a privacy management platform. The privacy management system 10 includes a privacy action device 12 configured to receive requests to perform different privacy actions (e.g., obfuscation) on the data as a service to clients. The privacy action device 12 is described in more detail below. In the illustrated embodiment of FIG. 1, the privacy management system 10 includes input systems for receiving requests, such as requests from clients to delete or obfuscate data or records.

For example, a new privacy request system 14 is configured for receiving privacy requests from new clients, such as clients who may wish to request a one-time service, clients being registered as new clients, etc. The requests may include demands to perform different types of privacy actions, such as deleting and/or obfuscating data or data records. Requests for privacy services may be generated by computing devices in the system as an automatic response to established parameters. In such a system the requests originate within the computing system and are generated in response to specific parameters such as time on system, date, sensitivity, or other classification. In additional embodiments parameters for generating privacy requests may be based on routine maintenance or a specified date. Further, requests for privacy services may be received via a community web form 16 (e.g., internal and/or external community web forms), a voice system (e.g., an interactive voice response (IVR) 18 system), a short message service (SMS) bot 20, or other input devices. The request is sent to an identity verification system 22 configured to verify the identity of the new client.

The privacy management system 10 further includes an existing privacy request system 24 for receiving new requests for privacy services (e.g., request to delete/obfuscate data records) from existing clients. The existing privacy request system 24 may also receive other types of input from a client, such as receiving changes to an existing privacy request from the client, etc. The existing privacy request system 24 may include community web forms 26 and an IVR 28 for receiving requests from existing clients. The new privacy requests and existing privacy requests from the new privacy request system 14 and existing privacy request system 24, respectively, may be provided to the privacy action device 12 via a case management platform 30. The case management platform 30 may include systems configured to manage privacy requests according to the clients' needs.

In additional embodiments, the privacy management system 10 of FIG. 1 includes databases and/or tables accessible to privacy modules of the case management platform 30. Also, a privacy host system 36 may be configured to enable one or more managers (or a staff of people) to service and monitor activities within the privacy management system 10. The managers/staff can enter data as needed and/or view operational conditions and client information (when specific authorization for certain managers/staff is given) using the privacy host system 36. The privacy host system 36 also allows the managers/staff to perform other operations as needed to maintain the privacy management system 10. Maintenance on the privacy host system is also capable of receiving scheduled information and conducting operations based on the scheduled maintenance event.

Also shown in the example embodiment of a privacy management system 10 of FIG. 1, is a data identification (ID) system 38. The data ID system 38 includes one or more crawlers 42 (e.g., web crawlers or other types of network crawling devices). The crawlers 42 may be configured as an Internet bot that searches or browses the Internet, World Wide Web, Wide Area Network (WAN), or any other distributed network. The crawlers 42 may include search engines for performing Web indexing and updating web content of various web sites so that web searches can be performed more efficiently. Web crawlers are also known as web spiders or web robots and various algorithms are attributed to the crawling nature and efficiency of the web crawler. Results from the crawlers 42 may be provided to databases 44 and/or integrated Software as a Service (SaaS), Infrastructure as a Service (IaaS), and/or Platform as a Service (PaaS) components 46. The crawlers 42 listed herein is but one example of a data ID system 38, additional indexing algorithms and identification methods are contemplated and disclosed.

In another example embodiment, the data identification system 38 is configured to determine a certain number of items (e.g., six items) that reside in a number of columns (e.g., six columns) needing obfuscation. In additional embodiments the data identification system 38 can be configured to support any number of items, so long as at least one item is designated. In the example embodiment of FIG. 1, two of these items may include a first name field (frame) and a last name field (lname). Some of the remaining items in this example may be null (empty), or filled with representative data fields. In the example embodiment, the six items may be individually placed in a message queue of an engine as "tasks," lined up for obfuscation and deletion or other privacy actions, as described below.

In the example embodiment of FIG. 1 crawlers 42 are configured to store data in the databases 44 and/or supply information to the integrated SaaS/IaaS/PaaS components 46. Likewise, the privacy action device 12 may perform certain functions, as described below, and store data in the databases 44 and provide information to the integrated SaaS/IaaS/PaaS 46.

When the case management platform 30 receives notifications that all six task IDs on a case (e.g., case number 0001) are complete, a Certificate of Destruction may be generated and presented to the requestor. In additional embodiments the number of task ID's required can be set to any number greater than one. The Certificate of Destruction may simply be an acknowledgement or receipt that the deletion/obfuscation has be completed. In other embodiments the Certificate of Destruction can exist in complex forms such as part of a block chain system or a web token or additional embodiments that may be preserved as identification of the deletion/obfuscation task.

The community web forms 16, 26 of the new privacy request system 14 and existing privacy request system 24 may be configured as a customer relationship management (CRM) system, which may include hardware/software for managing the business relationships and interactions that a client may have with customers and/or potential customers. The purpose of a typical CRM system is to develop the client's business relationships to enable the client to maintain contact with customers, optimize various customer processes, etc.

The privacy host system 36 of FIG. 1 may enable any employees (e.g., customer service employees, recruiters, human resources personnel, marketing personnel, etc.) to utilize the CRM system of the present disclosure. Thus, the privacy host system 36 may enable these employees to manage the business relationships and interactions with customers, potential customers, staff, etc., for a client. The CRM system allows the client to store contact information for its customers (and potential customers), sales opportunity information, service issue records, etc., to allow the privacy action device 12 to manage customer information (e.g., privacy information) in one location, such that various employees can access the privacy information, as needed and according to various levels of security authorization.

In FIG. 1, the SMS bot 20 is configured to simplify communication flow in the privacy management system 10. The SMS bot 20 may provide a user interface for allowing customers to make new privacy requests. In additional embodiments the SMS bot is an engine utilized in facilitating communications in the new privacy request system 14.

The Identity Verification module 22 of the new privacy request system 14 may include hardware/software for providing digital identity processing as well as fraud protection. This process may also include verification and authentication of identity information to prevent identity theft, while also making it easy for a new client to join or for a new privacy request to be made in an easy and user-friendly manner. Example embodiments of hardware/software features for identify verification include biometric identification, knowledge-based authentication, two-factor authentication, and additional verifications that facilitate the verification of a user.

Figure 2:
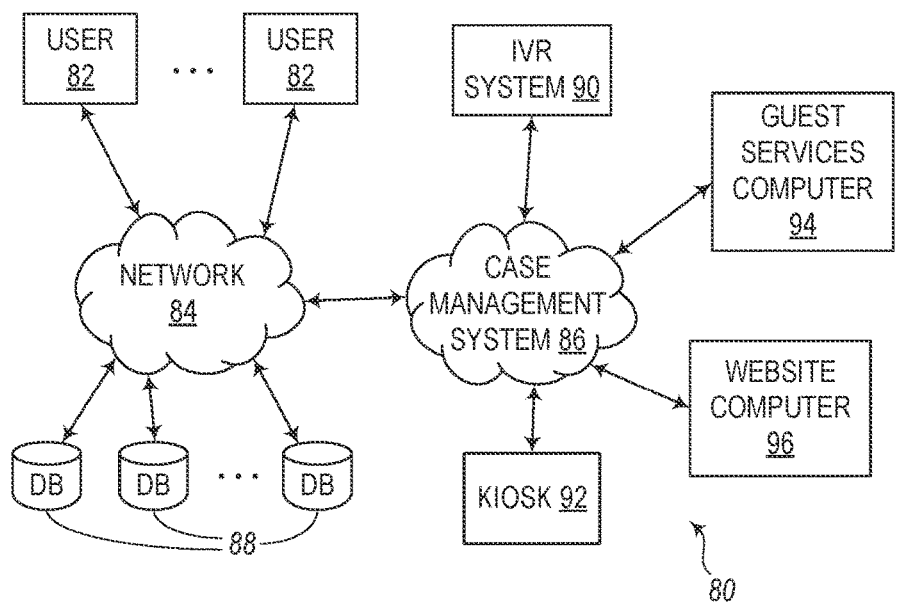
FIG. 2 is a block diagram illustrating another privacy management system, according to various embodiments.

FIG. 2 is a block diagram illustrating an example embodiment of a computing system 80 for enabling case management system 86 services for one or more clients or users 82. The computing system 80 in this embodiment includes a network 84, such as a Wide Area Network (WAN), the Internet, or other suitable communications network. The computing system 80 also includes a case management system 86 in communication with the network 84. In particular, the computing system 80 may be configured to provide privacy services for users 82. For example, personal records and other information pertaining to an individual may be stored in one or more databases 88, files, etc., which may be accessible to various systems in communication with the network 84. When a client's identification is verified, the user 82 may request access to the personal information of the client. When this information is accessed, the client may desire to or further request the performance of certain privacy-type functions on the data. For example, the user 82 may wish to modify information in the data, delete certain information according to certain deletion/obfuscation techniques, or other privacy actions.

In the example embodiment of FIG. 2, the case management system 86 may be configured to receive a request from a user 82 over a network 84. The request may be received by any network 84, including phone, mail, in person, by a representative using the privacy host system 36 or guest services computer 94, via the network or Internet using a web-based computer (e.g., user 82), using an interactive voice response (IVR) system 90, via text message, over a cloud network, or by other suitable method. The requests may be made online using a user device 82 connected to the network 84. In some embodiments, the request can be made using a kiosk 92, using a guest services computer 94, or using via a website using a website computer 96. Once a request is received, the case management system 86 may be configured to perform an automated ID verification process to verify that the client is legitimate (e.g., by determining whether the client is himself/herself or is a legal representative of the client, etc.) and has authority to access the client's personal information. The case management system 86 can then open a ticket or service order for showing the services that are to be performed for the client.

In the computing system 80, multiple databases 88 may be available for access by the users 82. The databases 88 may be diverse and separately managed by various service companies. For example, one or more data service systems, which may represent various data service companies, may be connected to the case management system 86. In turn, the data service systems are configured to manage and/or access one or more of the databases 88. Therefore, in combination, the case management system 86 may be able to integrate together the various databases 88 via the data service systems to an accumulated database that can be processed under one platform.

The case management system 86 may be configured to operate in compliance with various privacy laws and regulations according to the jurisdiction in which the case management system 86 is deployed. For example, the case management system 86 may operate in compliance with the California Consumer Privacy Act (CCPA), the California Privacy Rights Act (CPRA), the General Data Protection Regulation (GDPR), and other evolving privacy rules and regulations, to name a few. Further, the case management system 86 may be configured to operate with an organization's internal policies and compliance through set parameters.

In operation, when a request has been received and ID information of the requester is verified, the case management system 86 integrates the databases 88 in order to be able to search across multiple databases 88, network environments, enterprises, etc. from a single platform. For example, if a client wishes to search for or delete records regarding a person (e.g., having a name "John Smith"), the case management system 86 is configured to search the databases 88 and other environments for "John Smith" and returns a result to the user 82, such as, "We found 163 results for John Smith." This search may be conducted through the data ID system 38, utilizing a crawler 42 or through additional searching algorithms as known in the art.

In the example embodiment, in response to the results that were found, the user 82 can perform various actions, depending on the client's authorization. In additional embodiments, the user is replaced with a computing system that is configured with parameters to define when the case management system 86 performs specific actions. In one example, the client may wish to delete certain files or records. The client may also wish to simply view the records. In other cases, the client can modify the records. These actions are but a few actions that can be taken by a client through the computing system or by the computing system alone to accomplish tasks associated with the case management system 86. The computing system 80 provides an end-to-end automated system that allows the user 82 to delete records stored in diverse databases 88 and/or perform other various actions on the data records.

Figure 3:
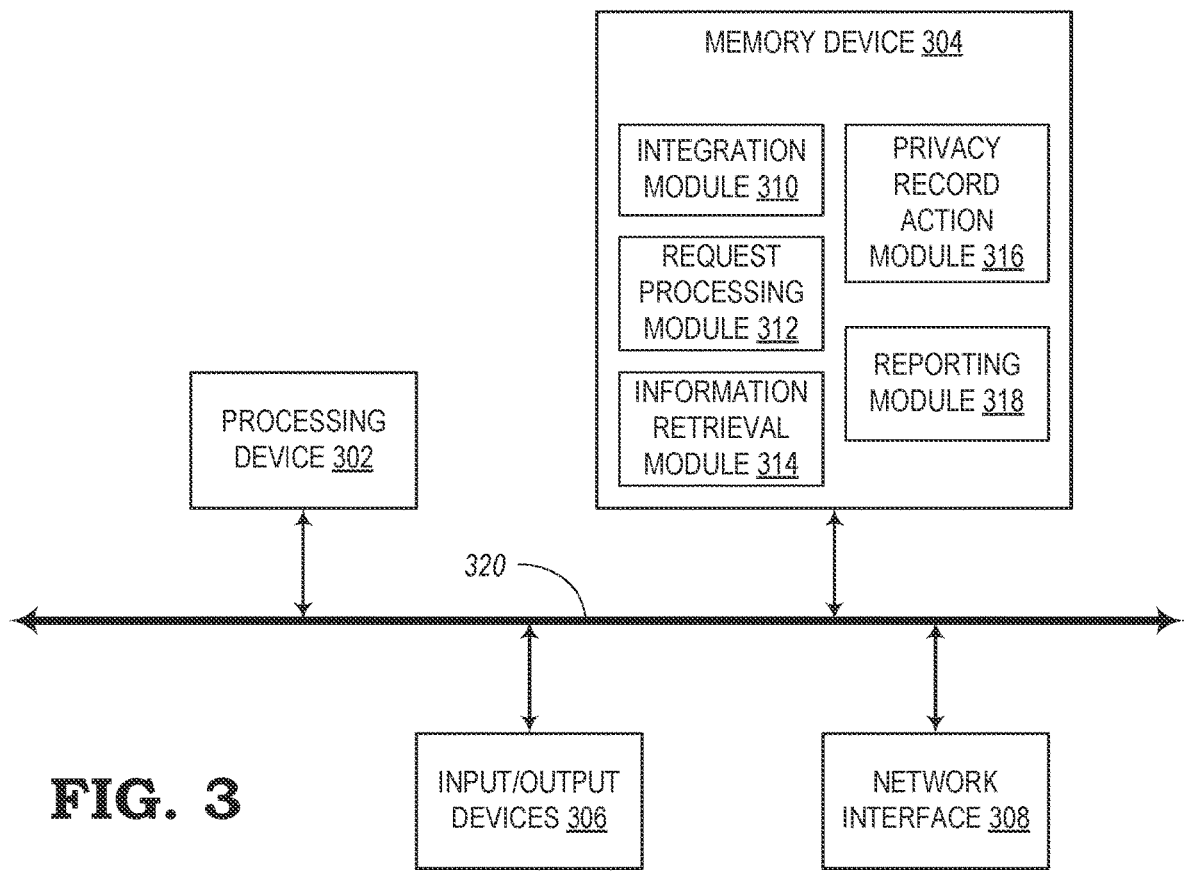
FIG. 3 is a block diagram illustrating a computer system for managing customer requests, according to various embodiments.

FIG. 3 shows a block diagram of an example embodiment of a privacy action device 300 (e.g., representing the privacy action device 12 shown in FIG. 1, the case management system 86, kiosk 92, guest services computer 94, or website computer 96 shown in FIG. 2, etc.). The privacy action device 300 may include a processing device 302, a memory device 304, input/output devices 306, and a network interface 308. Those skilled in the pertinent art will appreciate that various embodiments may be described in terms of logical blocks, modules, circuits, algorithms, steps, and sequences of actions, which may be performed or otherwise controlled with a general purpose processor, a DSP, an application specific integrated circuit (ASIC), a field programmable gate array, programmable logic devices, discrete gates, transistor logic, discrete hardware components, elements associated with a computing device, or any suitable combination thereof designed to perform or otherwise control the functions described herein. The processing device 302 may be a general purpose processor or microprocessor, but in the alternative, the processing device 302 may be any conventional processor, controller, microcontroller, or state machine. In further embodiments the processing device 302 may be a special purpose computing device, that is equipped with the hardware and software to execute the system. A processing device 302 may also be implemented as a combination of computing devices, e.g., a combination of a DSP and a microprocessor, a plurality of microprocessors, one or more microprocessors in conjunction with a DSP core, or any other such configuration.

For example, one way that the privacy action device 300 (or privacy action device 12) may operate is that it may receive a privacy request (e.g., to delete or obfuscate data) from the privacy management system 10 or another suitable platform. The request may be temporarily stored in the memory 304 (or in the databases 44 shown in FIG. 1, ledgers, message queues, or in any other suitable memory device), where it may be stored as one or more "tasks." The privacy action device 300 looks at the first (or next) task to be processed and determines how the data can be safely handled. The privacy action device 300 queries the different data sources where the data is stored to make sure that the data sources still exist and that they are legitimate sources. Then, the privacy action device 300 may be configured to look at a table to determine how the data can be accessed, viewed, modified, obfuscated, deleted, etc. without causing undesirable issues or consequences elsewhere in the network or system. For example, it may be determined that certain information may be relied upon by other applications in the privacy management system 10 and cannot be completely deleted without causing errors in those other applications.

The privacy action device 300 may dynamically look for instructions regarding a privacy action (e.g., stored in a table) and then apply corresponding logic to perform a requested personal or private action on the data in a safe way that does not harm the memory device 304, databases 44, or downstream systems. Afterwards, the privacy action device 300 may perform a self-check process to make sure that the privacy action has actually been performed on the data. For example, in an obfuscation or deletion process, it may be desirable to determine that the privacy data has been sufficiently obfuscated to the point where it no longer matches the data in the memory device 304 or databases. This can be considered to be a self-audit or self-validation process.

The memory device 304 may be configured to store one or more computer software programs for performing various functions related to executing the privacy actions. For example, the memory device 304 may include an integration module 310, a request processing module 312, an information retrieval module 314, a privacy record action module 316, and a reporting module 318. The modules 310, 312, 314, 316, 318 may include an engine configured to include one or more Application Programming Interface (API) components and/or software code or logic to perform the various privacy actions. Thus, the privacy actions may be executed by any combination of hardware (e.g., processing device 302), firmware, and/or software elements of the privacy action device 300.

The integration module 310 may be configured to enable the processing device 302 to integrate the distributed databases (e.g., databases 88) located throughout the network 84 in order that all the databases may be viewed as a single database. The request processing module 312 is configured to allow the processing device 302 to receive a privacy action request from a client. As described in more detail below, the requests may be received by a number of different processes, including, for example, a concierge computer, a kiosk, a computer accessing a website server over the network, an IVR system, or by other means.

The information retrieval module 314 is configured to retrieve data records from a number of data sources or databases for comparison with each other and to determine if the data sources are legitimate and the data still exists on these data sources. The privacy record action module 316 includes receiving a specific type of request from a client for initiating one or more actions that may be performed on the private data. For example, the client may choose to access the data, modify the data, update the data, etc. Also, the client may choose to obfuscate and/or delete the privacy data if desired to eliminate unnecessary iterations of the saved data records throughout the network. After performing the privacy action by the privacy record action module 316, the reporting module 318 may be configured to confirm that the action has indeed been handled and sufficiently completed. For example, in the case of obfuscation, the reporting module 318 may be configured to create a Certificate of Destruction that confirms that a request to obfuscate data has been completed. The Certificate of Destruction, as previously disclosed, may be in any form (e.g., electronic, paper, etc.), including various levels of complexity (e.g. block chain), and may be presented to the client in any suitable manner to ensure the client that the privacy data has been handled.

The privacy action device 300 may be configured to run silently behind the scenes without communicating with other applications on the network. It may be deployed as a loyalty function in a system-wide or enterprise-wide Autonomous System (AS). By operating to delete/obfuscate data on demand, the program is built to ensure that issues do not arise in a downstream system. For instance, if a row of data were removed, there is a possibility that downstream applications may experience errors that may be critical to various business operations. When instructed to delete, the privacy action device 300 can detect the system 10 80 to determine if deletion would cause problems.

Further, those skilled in the pertinent art will appreciate that the various illustrative logical blocks, modules, circuits, algorithms, and steps described in connection with the embodiments described in the present disclosure may be implemented as electronic hardware, computer software, or any suitable combinations thereof. To clearly illustrate this interchangeability of hardware and software, various illustrative components, blocks, modules, circuits, algorithms, and steps have been described herein in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

According to some embodiments, FIG. 3 illustrates an embodiment of the privacy action device 300 for offering privacy services for a user/client and allowing the user/client to make certain requests, such as search for the client's name among multiple databases that may be accessed by various systems throughout the network 10 of FIG. 1 or network 84 of FIG. 2. In some embodiments, the services may include deleting personal records from these databases to allow the user/client to be able to be invisible from hackers, robocalls, telemarketers, etc. In the illustrated embodiment, the privacy action device 12 may be a digital computer that, in terms of hardware architecture, generally includes the processing device, the memory device, the input/output (I/O) devices, and the network interface.

The memory device 304 may include a data store, database, or the like. It should be appreciated by those of ordinary skill in the art that FIG. 3 depicts the privacy action device 12 in a simplified manner, where practical embodiments may include additional components and suitably configured processing logic to support known or conventional operating features that are not described in detail herein. The components are communicatively coupled via a local interface 320. The local interface 320 may be, for example, but not limited to, one or more buses or other wired or wireless connections. The local interface 320 may have additional elements, which are omitted for simplicity, such as controllers, buffers, caches, drivers, repeaters, receivers, among other elements, to enable communications. Further, the local interface 320 may include address, control, and/or data connections to enable appropriate communications among the components.

The processing device 302 is a hardware device adapted for at least executing software instructions. The processing device may be any custom made or commercially available processor, a central processing unit (CPU), an auxiliary processor among several processors associated with the case management platform 30, a semiconductor-based microprocessor (in the form of a microchip or chip set), or generally any device for executing software instructions. When the privacy action device 12 is in operation, the processing device 302 may be configured to execute software stored within the memory device 304, such as the obfuscation module 70, to communicate data to and from the memory device 304, and to generally control operations of the case management platform 30 pursuant to the software instructions.

It will be appreciated that some embodiments of the processing device 302 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 302 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASCs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry or logic" that is "configured to or adapted to" perform a set of operations, steps, methods, processes, algorithms, functions, techniques, etc., on digital and/or analog signals as described herein for the various embodiments.

The I/O devices 64 may be used to receive user input from and/or for providing system output to one or more devices or components. User input may be provided via, for example, a keyboard, touchpad, a mouse, and/or other input receiving devices. The system output may be provided via a display device, monitor, graphical user interface (GUI), a printer, and/or other user output devices. I/O interfaces 64 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The network interface 308 may be used to enable the privacy action device 12 to communicate over the case management platform 30, case management system 86, the Internet, a wide area network (WAN), a local area network (LAN), network 10, 84, and the like. The network interface 308 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 308 may include address, control, and/or data connections to enable appropriate communications on the case management platform 30. The network interface 308 also allows communication with the integrated SaaS/IaaS/PaaS 46 and/or databases 44 or memory device 304.

The memory device 304 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 304 may incorporate electronic, magnetic, optical, and/or other types of storage media. The memory device 304 may have a distributed architecture, where various components are situated remotely from one another, but can be accessed by the processing device. The software in memory device 304 may include one or more software programs, each of which may include an ordered listing of executable instructions for implementing logical functions. The software in the memory device 304 may also include a suitable operating system (O/S) and one or more computer programs. The operating system (O/S) essentially controls the execution of other computer programs, and provides scheduling, input-output control, file and data management, memory management, and communication control and related services. The computer programs may be configured to implement the various processes, algorithms, methods, techniques, etc. described herein.

The memory device 304 may include a data store used to store data. In one example, the data store may be located internal to the privacy action device 300 and may include, for example, an internal hard drive connected to the local interface in the privacy action device 300. Additionally, in another embodiment, the data store may be located external to the privacy action device 300 and may include, for example, an external hard drive connected to the I/O devices or interfaces (e.g., SCSI or USB connection). In a further embodiment, the data store may be connected to the privacy action device 300 through a network and may include, for example, a network attached file server.

Moreover, some embodiments may include a non-transitory computer-readable storage medium having computer readable code stored in the memory device 304 for programming the privacy action device 12 or other processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 302 that, in response to such execution, cause the processing device 302 to perform a set of operations, steps, methods, processes, algorithms, functions, techniques, etc. as described herein for the various embodiments.

Figure 4:
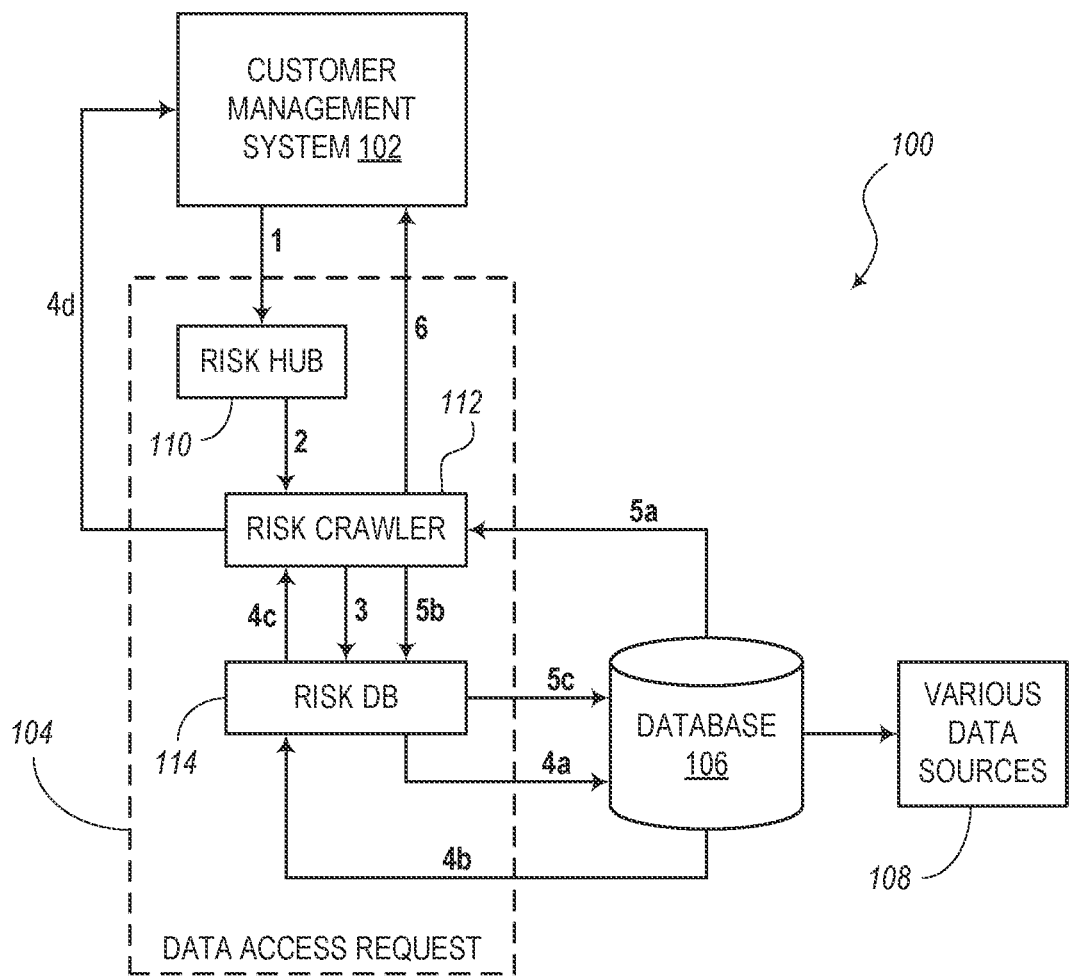
FIG. 4 is a block diagram illustrating a system related to an Application Programming Interface (API), according to various embodiments.
Figure 5:
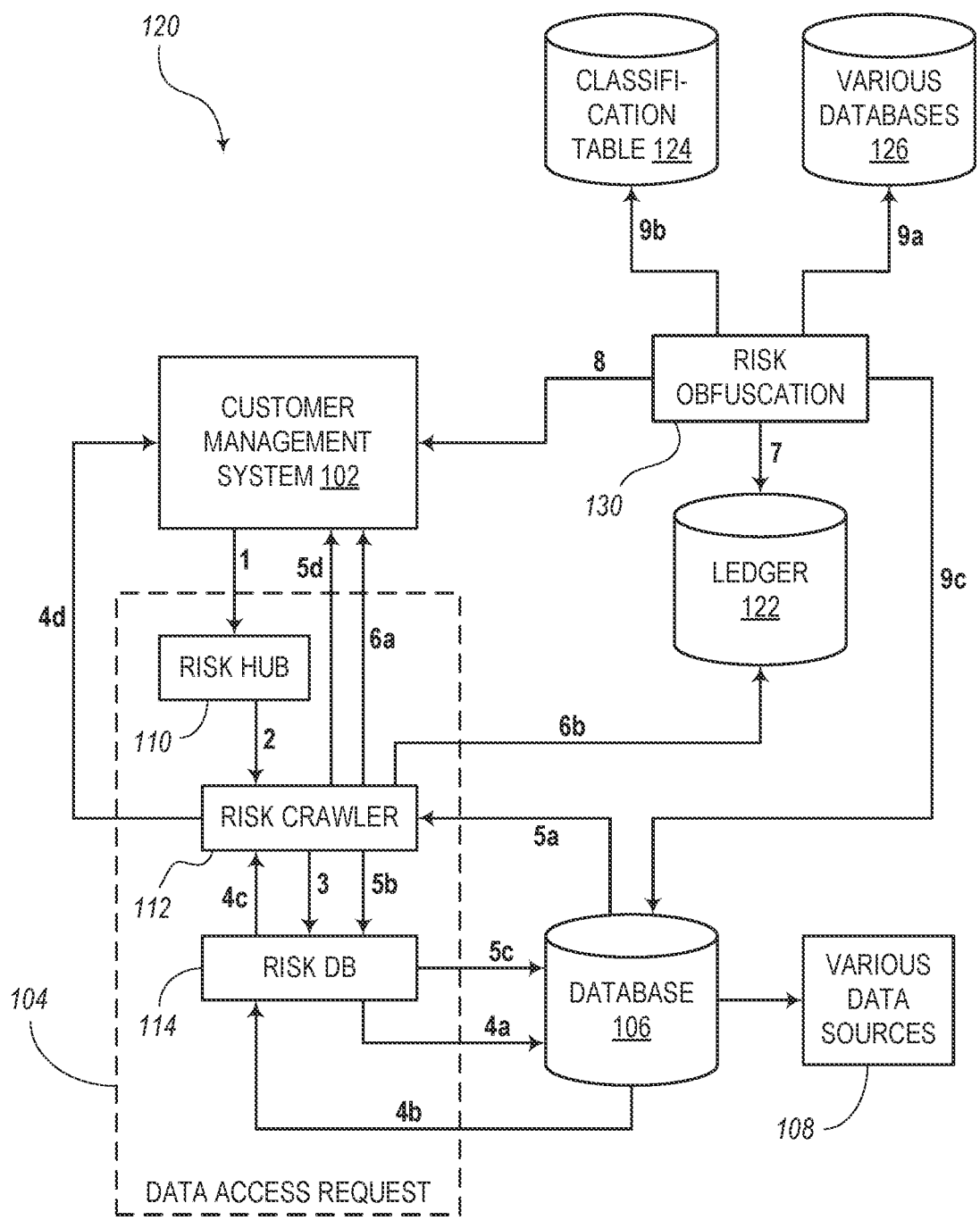
FIG. 5 is a block diagram illustrating another system related to an API, according to various embodiments.

FIG. 4 is a block diagram illustrating an embodiment of a system 100 showing Application Programming Interface (API) calls. The system 100 comprises a customer management system 102, a data access request system 104, a database 106 (e.g., implemented as a data storage system for storing large amounts of data), and various data sources 108. The data access request system 104 includes a risk hub module 110, a risk crawler module 112, and a risk DB module 114. The sequence of the programming calls is also shown in FIG. 5 and described below.

For performing a POST operation, steps 1, 2, 3, and 4a are executed. In step 1, a call is made from the customer management system 102 to the risk hub module 110 of the data access request system 104. The call 1 may include:
POST requestType=access
id=<companyid>
email, displayName, address, phone In step 2, a call is made from the risk hub module 110 of the data access request system 104 to the risk crawler module 112 of the data access request system 104. The call 2 may include:
POST requestType=access
id=<companyid>

In step 3, a call is made from the risk crawler module 112 of the data access request system 104 to the risk DB module 114 of the data access request system 104. The call 3 may include:
POST requestType=access
id=<companyid>

In step 4a, a call is made from the risk DB module 114 of the data access request system 104 to the database 106. The call 4a may include:
POST (synch call)

For performing a reporting operation, steps 4b, 4c, and 4d may be executed. In step 4b, a call is made from the database 106 back to the risk DB module 114 of the data access request system 104. The call 4b may include:
reportID=<reportID>

In step 4c, a call is made from the risk DB module 114 of the data access request system 104 to the risk crawler module 112 of the data access request system 104. The call 4c may include:
requestType=access
id=<companyid>
reportID=<reportID>

In step 4c, a call is made from the risk DB module 114 of the data access request system 104 to the risk crawler module 112 of the data access request system 104. The call 4c may include:
requestType=access
id=<companyid>
reportID=<reportID>

In step 4d, a call is made from the risk crawler module 112 of the data access request system 104 to the customer management system 102. The call 4d may include:
POST requestType=access
id=<companyid>
reportID=<reportID>

For performing a get or callback operation, steps 5a, 5b, and 5c, may be executed. In step 5a, a call is made from the database 106 to the risk crawler module 112 of the data access request system 104. The call 5a may include:
Callback async
POST reportID=<reportID>

In step 5b, a call is made from the risk crawler module 112 of the data access request system 104 to the risk DB module 114 of the data access request system 104. The call 5b may include:
GET reportID=<reportID>

In step 5c, a call is made from the risk DB module 114 of the data access request system 104 to the database 106. The call 5b may include:
GET reportID=<reportID>

In step 6, the risk crawler 112 of the data access request system 104 reports back to the customer management system 102. In additional embodiments the data request system 104 reports back to a data management system or a service management system.

FIG. 5 is a block diagram illustrating another embodiment of a system 120 showing API calls and includes many of the same elements shown in the embodiment of FIG. 4. The system 120 includes the customer management system 102, the data access request system 104, the database 106, and the various data sources 108, as shown in FIG. 4. In addition, the system 120 of FIG. 5 also includes a ledger 122 (e.g., obfuscation ledger), a risk obfuscation module 130, classification table 124, and various other databases 126. Again, the sequence of calls is shown in FIG. 5. Steps 1, 2, 3, 4a, 4b, 4c, 4d, 5a, 5b, and 5c described with respect to FIG. 5 may be included in the API process illustrated in FIG. 5.

In addition to the previously described steps, the sequence may further include steps 6a, 6b, 7, and 8. In step 6a, a call is made from the risk crawler module 112 of the data access request system 104 to the customer management system 102. The call 6a may include:
GET requestType, companyID for reportID In step 6b, a call is made from the risk crawler module 112 of the data access request system 104 to the ledger 122. The call 6b may include:
PARSE JSON into individual tasks POST requestType, reportID, companyID, tasks In step 7, a call is made from the risk obfuscation module 130 to the ledger 122. The call 7 may be single threaded and may include processing one task at a time. After each step, the risk obfuscation module 130 may be configured to write a pass/fail result to the ledger 122.

In step 8, a call is made from the risk obfuscation module 130 to the customer management system 102. The call 8 may include an update of an object at completion of all tasks for the reportID.

The risk obfuscation module 130 may be configured (step 9a) to record "tasks" in the various databases 126. Also, the risk obfuscation module 130 may be configured (step 9b) to periodically add obfuscation refresh information of a data classification catalog to the classification table 124. For example, the information may be refreshed according to any periodic schedule, such as hourly, daily, weekly, etc. The periodic refreshing may include updating once a day (e.g., nightly). In some embodiments, the classification table 124 may be stored in the ledger 122 or other obfuscation ledger.

Also, the risk obfuscation module 130 may be configured (step 9c) to periodically add obfuscation refresh information of a data source catalog to the database 106. For example, the information may be refreshed in any suitable period, such as hourly, daily, weekly, etc. The periodic refreshing may include updating once a day (e.g., nightly).

According to some embodiments, methods may be executed by the systems 100, 120. The methods may include the following steps: STEP 0: Write task to ledger 122 and match to reported. STEP 1: Confirm the data in the task matches the data in the database 106 using DS Catalog information to look up the data (quality assurance to ensure the task is valid and report to Ledger as PASS/FAIL). STEP 2: Obfuscate the data in the database using the data classification model to determine the method of obfuscation (rip/replace, encrypt/keyflush, etc) and report status to the Ledger as PASS/FAIL. STEP 3: Validate the data in the task no longer matches the data in the database (quality assurance to self-check obfuscation and report to Ledger as PASS/FAIL). STEP 4: Report task status (hopefully, complete) to the System of Record (e.g., a case management platform) by checking the ledger 122 of the privacy action device 120 for three PASS flags from each step.

A ledger schema layout (e.g., for the ledger 122) may include data classification model criteria for all possible obfuscation types (name, email, address, city, state, zip, phone, IP, mac, employee, username, guide, loyalty card, household, transid, companyid). The ledger schema layout may need an email encryption process flow. The ledger schema layout may also include Legal Holds and a Task ID in Full Report JSON.

Figure 6A:
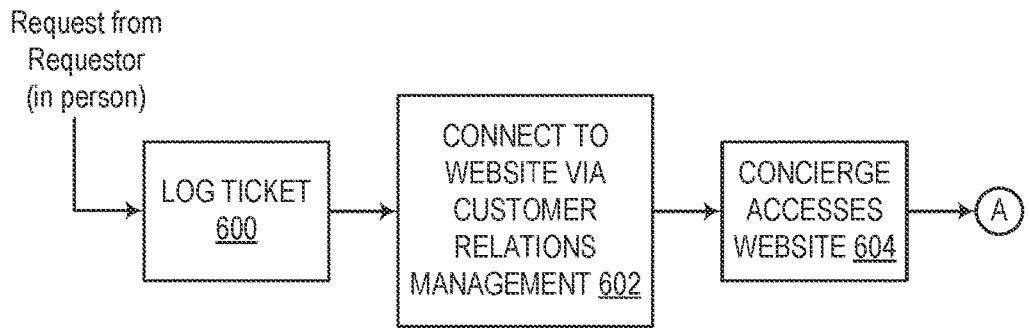
FIGS. 6A-6C are block diagrams illustrating initial processes for receiving different types of client requests, according to various embodiments.
Figure 6B:
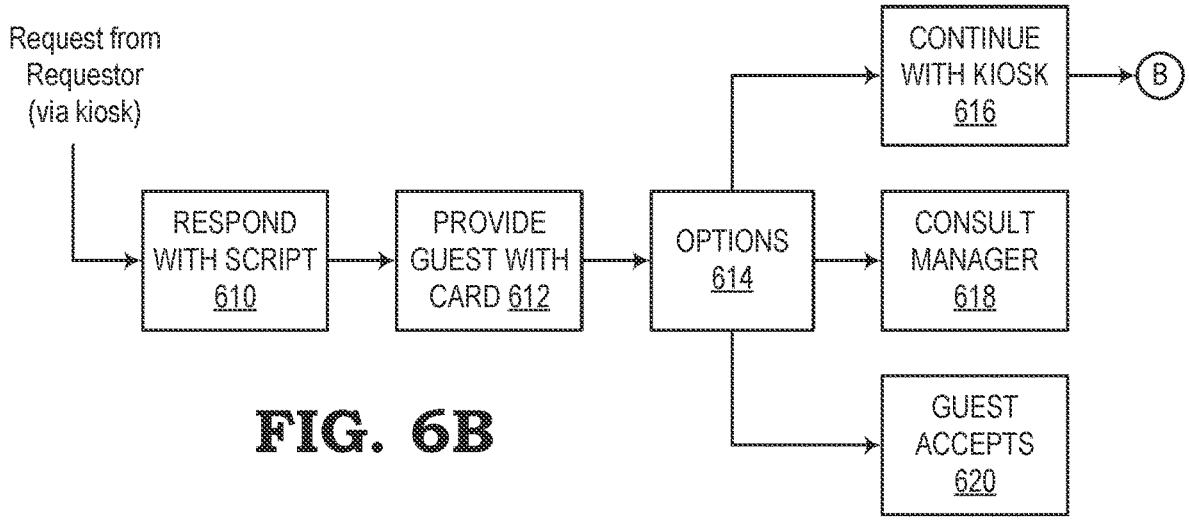
Figure 6C:
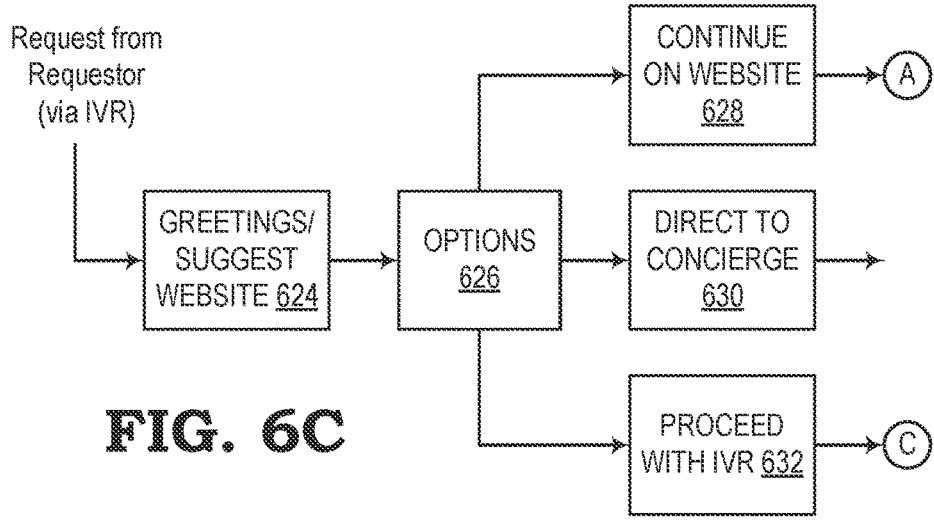

FIGS. 6A-6C show different ways in which a requestor (or client) can make a request for the execution of a privacy action. FIG. 6A shows an in-person process where a requestor may visit a representative of a data/client management system in person or, in some cases, may receive assistance from the representative by a phone call. In this case, the representative or concierge may help the requestor by utilizing a guest services computer 94 to access the privacy action device 300. FIG. 6B shows a process where a requestor does not get assistance from a personal representative or concierge, but instead utilizes a kiosk, public computer, or other suitable interface device for accessing the privacy action device 300. FIG. 6C shows a process where a requestor has access through the privacy action device 300 via an IVR system.

FIG. 6A includes a representative receiving a request (verbal) from a requestor in person and creating a log ticket 600. Next, the representative may connect to a website (e.g., website computer 96) via a customer relations management device (e.g., guest services computer 94), according to block 602. Next, the concierge may access the website 604.

FIG. 6B includes a kiosk receiving a request from a requestor. The kiosk may respond with a script 610 to allow the requestor to make a specific request. In some embodiment, the kiosk may provide the guest (requestor) with a card that allow the guest to utilize the kiosk or to enter a code, as indicated in block 612. Block 614 includes a screen where the guest may choose one of multiple options. A first option may include continuing the privacy action request with the present kiosk 616, consulting a manager 618, or the guest accepting results 620.

FIG. 6C includes an IVR system where a request is received and a verbal greeting is provided 624, which may also include a suggestion to use the website. At this point, the user may be given multiple options 626 that can be entered on a phone keypad. One option may include continuing on a website 628, being directed to a concierge 630 who can give personalized attention, or proceeding with the request via the IVR system.

Figure 7:
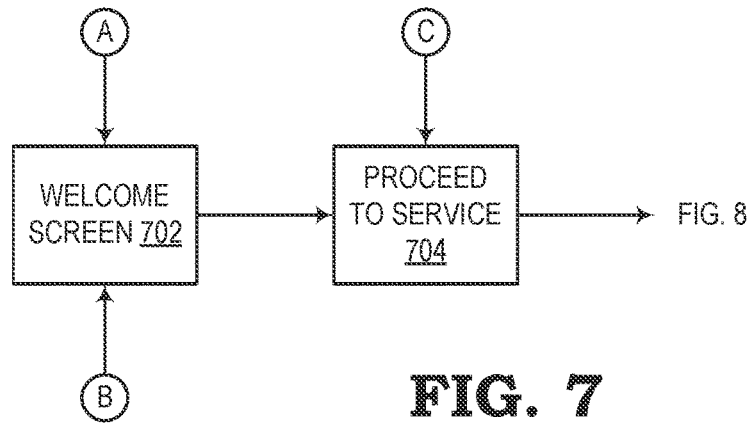
FIG. 7 is a block diagram illustrating initial steps of receiving client requests and starting a process for performing privacy actions, according to various embodiments.

FIG. 7 shows the various request options from FIGS. 6A-6C being combined. The website can be accessed via the website by a guest computer, concierge computer, kiosk, or other device, which may include a welcome screen 702. Also, the IVR system may proceed 704 to the privacy action service using parallel processes.

Figure 8:
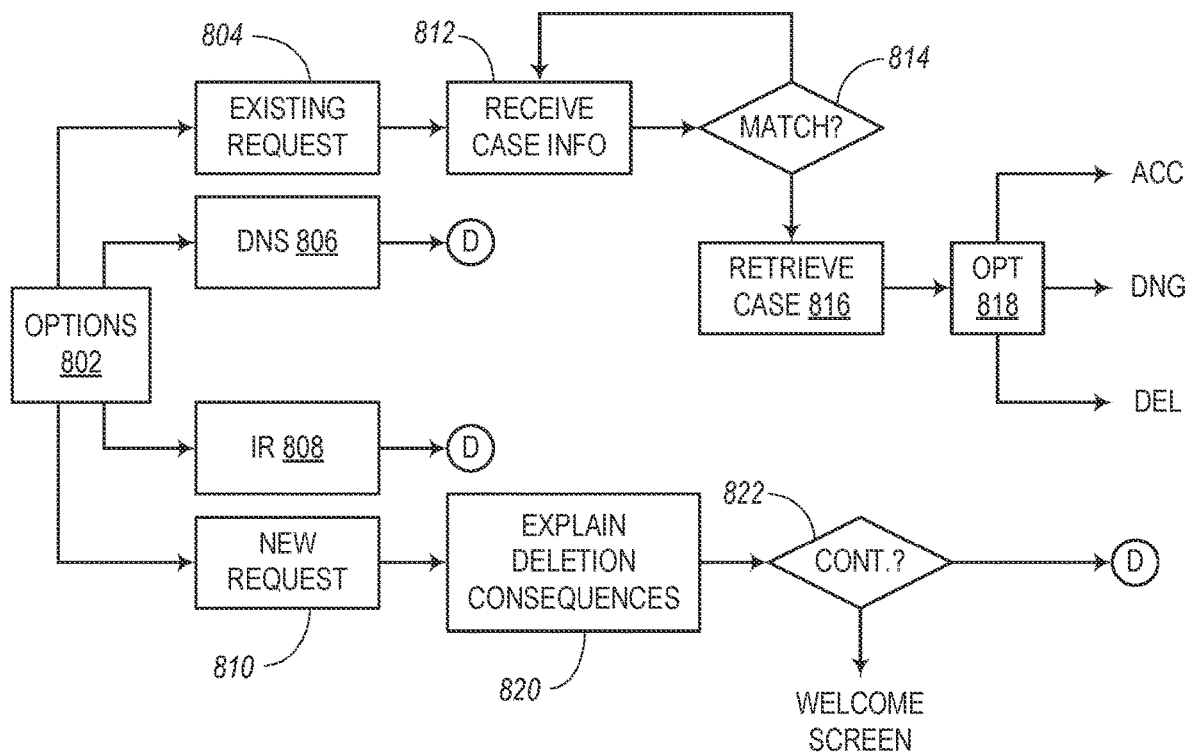
FIG. 8 is a block diagram illustrating a process of providing different options to a client for performing different types of privacy requests, according to various embodiments.

FIG. 8 is flow diagram showing initial steps of the privacy action service, which, as suggested above, may be accessed in a number of different ways using various computers or IVR systems. In block 802, the user is given a number of options depending on what type of service is needed. If the user has an existing request 804, the user may choose to recall this request case. The process may include receiving the case information 812 and determining if the case information matches 814 the user request. If not, the process can loop back to block 812. However, the case information does match, the system may be configured to retrieve the case 816 and then provide additional options 818.

In the case where the user selects the DNS option 806, a DNS process can be run. If the user selects the IR option 808, an IR process can be run. If a new request option 810 is received, then the process may provide an explanation of various consequences of actions that can be taken on the client data. For example, if the user requests to delete or obfuscate data, the consequences on other part of the network as a result of such deletion/obfuscation can be explained 820 to the user. If the user wishes to continue 822, the process continues. Otherwise, the user may be directed back to a welcome screen to start the process over from the beginning.

Various types of processes can be performed with regard to privacy actions. Also, each process may include multiple ways in which it is implemented. Although the multiple processes are not disclosed in particular here, it should be noted that any suitable new/existing request may be implemented, any DNS process, IR process, ACC process, DNG process, and/or DEL process can be implemented. For example, FIG. 9 shows an example of a general privacy action process.

Figure 9:
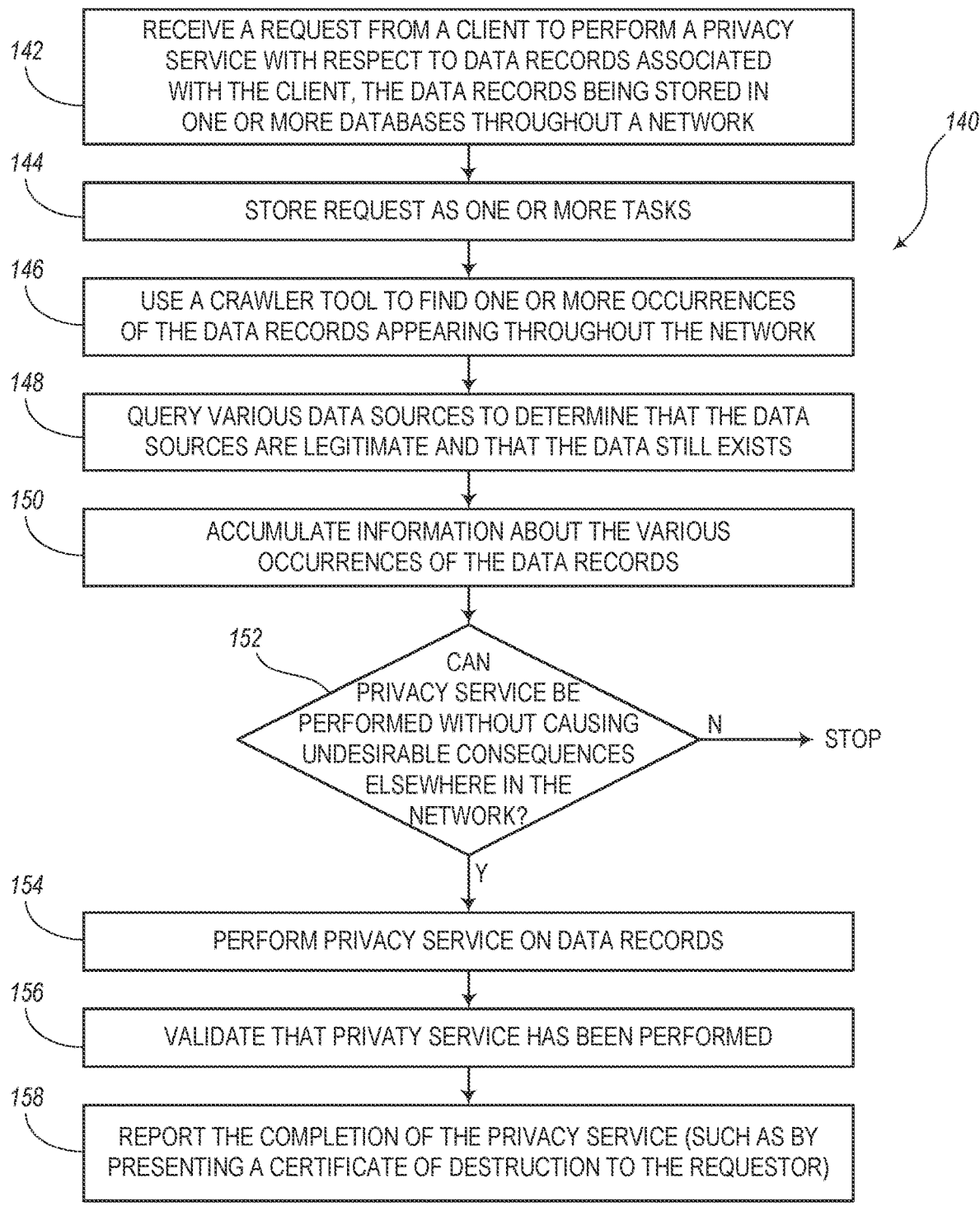
FIG. 9 is a flow diagram illustrating a process for managing client requests to perform different types of privacy actions, according to various embodiments.

FIG. 9 is a flow diagram showing an embodiment of a process 140 for handling privacy data for a client. In this embodiment, the process 140 includes receiving a request from a client to perform a privacy service with respect to data records associated with the client, as indicated in block 142. The data records, for example, may be stored in one or more databases throughout a network (e.g., the Internet, WAN, enterprise network, or other type of widespread network). The process 140 also includes storing the request as one or more tasks, as indicated in block 144. For example, the tasks may be executed one at a time.

The process 140 also includes using a crawler tool (e.g., web crawler) to find one or more occurrences of the data records appearing throughout the network, as indicated in block 146. For example, multiple occurrences of the data records may be stored in multiple databases dispersed throughout the network, where each occurrence may be accessible by the client. According to block 148, the process 140 may also include querying various data sources (e.g., databases) to determine that the data sources are legitimate and to determine that the data still exists in these data sources.

Also, the process 140 includes the step of accumulating information about the various occurrences of the data records, as indicated in block 150. According to the decision block 152, the process 140 also includes determining if the privacy service requested by the client can be performed without causing undesirable consequences or other disruptions elsewhere (e.g., downstream) in the network. For example, deletion/obfuscation may result in recovery errors in other applications running on the network. If it is determined that undesirable consequences would result, then the process 140 ends. Otherwise, the process 140 proceeds to block 154.

Block 154 includes the step of performing a privacy service on the data records, which may include, according to some embodiments, obfuscating and/or deleting one or more occurrences of the data records using any suitable type of obfuscation procedures to render the data records unintelligible, whereby the obscured records will be practically impossible for an unauthorized person (e.g., hacker) to decipher. Also, the process 140 may include a step of validating that the privacy service has been performed successfully, as indicated in block 156. In some embodiments, the process 140 may further include reporting the completion of the privacy service to the client, as indicated in block 158. For example, the reporting step (158) may include generating a Certificate of Destruction and presenting this certificate to the requestor.

The privacy actions may be performed within the system using any suitable processes. For example, there may be an initiation of a new request from a client. The requestor may interact with the case management platform 30, kiosk 92 guest services computer 94, etc. or may utilize a user device 82 to access the website for requesting the actions. The requestor may access the website via the case management system 86. The requestor may also use an interactive voice response (IVR) system by calling a specific telephone number associated with the case management system 86. The requestor can also interact using the guest services computer 94 by visiting a specific office or other location where a representative of a company associated with the case management system 86 or another server (e.g., website computer 96) is present. The representative may then talk with the client and enter information into the guest services computer 94 according to the requests from the requestor. In some cases, the requestor may go to an office or other location where a kiosk 92 is located and use a specific user interface to enter a request. The kiosk 92 may also be associated with a guest services location, a walk-in location, etc. The various interactions associated with the different ways to access the privacy services associated with the case management system 86 are shown in FIGS. 1-3 to enable a requestor to safely and securely enter a request.

Some processes may include deleting private data. The requestor may interact over a website or may enact a deletion process while present at a privacy office. By performing the steps of the process, a client's private data can be deleted.

The requestor may retrieve private information associated with a client. As mentioned above, the integration module 310 may be used to integrate multiple databases to search for records associated with a particular client. Also, the information retrieval module 314, upon receiving a legitimate request, will search the integrated databases for the desired records to retrieve the results of the search. As mentioned above, a user interface on a user computer 82, 92, 94, 300 may be configured to display the results of the search, such as, "We found 163 results for John Smith."

The processes for performing the privacy actions may include multiple entities, including the user computer, a website, an IVR system, guest services, a team member or walk-in computer, a privacy office, etc. related to the different people or devices associated with each of the various actions and entries in this process. These processes may be related to a resolution of the requested actions. A first request may be simply to search the databases to retrieve the information about a person (i.e., information retrieval (IR)). A second request may be a request to delete information about the person. A third request may utilize a domain name system (DNS) to request a page. A fourth request may involve creating "do-not-sell" protection. Upon request and operation of the fourth request, the client may be protected from having his/her personal information shared with certain third parties to thereby reduce hacking, robo-calling, etc.

Also, follow-up actions may be performed with the client in response to a privacy session using the website. The requestor may interact with the website and/or a privacy office in various situations to confirm that the various actions have been taken with respect to the user's personal data. Information retrieval (IR) services and deletion (DEL) services may be performed and confirmation can be made when the requestor is able to retrieve the information or when the data records have been deleted. Also, confirmation can be provided when a requested domain name system (DNS) action is performed and that domain name can be accessed.

The processes may also include creating a "do-not-sell" shield for preventing the user's personal information from being sold to various vendors against the user's will. This process may include input from the requestor, actions at the website level, and actions at the privacy office level. The privacy office may represent any walk-in service center, guest services station, kiosk location, private or public offices, etc. A crawler 42 may be used to search data records throughout the network, which may be system-based or located on the premises of a guest center or office.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A method comprising:
receiving a request from a client to perform a privacy action with respect to data records associated with the client in a network;
storing the request as a set of one or more tasks in a ledger, the one or more tasks being derived from the request;
based on the set of one or more tasks, using a crawler tool to find the data records appearing throughout the network in one or more data sources;
querying the one or more data sources to determine whether the one or more data sources are legitimate and whether the data records still exist on the one or more data sources;
determining if the privacy action will result in a disruption elsewhere in the network based on information associated with the data records and the one or more data sources;
performing the privacy action on the data records based on the set of the one or more tasks, wherein the privacy action is performed based on a dynamic lookup of instructions corresponding to the privacy action;
determining that the privacy action has been sufficiently completed based on a comparison of data corresponding to the set of one or more tasks and the found data records; and
reporting a performance of the privacy action to the ledger.

2. The method of claim 1, wherein the privacy action includes accessing or viewing the data records.

3. The method of claim 1, wherein the privacy action includes one or more of obfuscating the data records, deleting the data records, and determining a risk of obfuscating or deleting the data records.

4. The method of claim 1, wherein the step of receiving the request includes receiving the request via one of a web-based computer, a kiosk, and an Interactive Voice Response (IVR) system.

5. The method of claim 1, further comprising the step of accumulating information about the data records by integrating multiple databases distributed throughout the network.

6. The method of claim 1, wherein, before performing the privacy action, the method further comprises the step of determining whether the privacy action can be performed without causing an error elsewhere in the network.

7. The method of claim 1, further comprising reporting a completion of the privacy action.

8. The method of claim 7, wherein reporting the completion of the privacy action includes determining whether an obfuscation or deletion process has been completed and presenting a certificate of destruction to the client in response to determining that the obfuscation or deletion process has indeed been completed.

9. A management system comprising:
a processing device; and
a memory device configured to store instructions that, when executed, enable the processing device to:
receive, via a network interface, a request from a client to perform a privacy action with respect to data records in a network associated with the client;
store the request as a set of one or more tasks in a ledger, the one or more tasks being derived from the request;
use a crawler tool to find the data records appearing throughout the network in one or more data sources based on the set of one or more tasks;
query the one or more data sources to determine whether the one or more data sources are legitimate and whether the data records still exist on the one or more data sources;
determine if the privacy action will result in a disruption elsewhere in the network based on information associated with the data records and the one or more data sources;
perform the privacy action on the data records based on the set of the one or more tasks;
determine that the privacy action has been sufficiently completed based on a comparison of data corresponding to the set of one or more tasks and the found data records; and
report a performance of the privacy action to the ledger.

10. The management system of claim 9, wherein the privacy action includes one or more of accessing the data records, obfuscating the data records, deleting the data records, and determining a risk of obfuscating or deleting the data records.

11. The management system of claim 9, wherein the processing device is configured to receive the request via one of a web-based computer, a kiosk, and an Interactive Voice Response (IVR) system.

12. The management system of claim 9, wherein, before the processing device performs the privacy action on the data records, the instructions further enable the processing device to determine whether the privacy action can be performed without causing an error elsewhere in the network.

13. The management system of claim 9, further comprising reporting a completion of the privacy action.

14. The management system of claim 13, wherein reporting the completion of the privacy action includes determining whether an obfuscation or deletion process has been completed and presenting a certificate of destruction to the client in response to determining that the obfuscation or deletion process has indeed been completed.

15. A non-transitory computer-readable medium for storing computer logic having instructions for causing a processing device to:
receive a request from a client to perform a privacy action with respect to data records associated with the client in a network;
store the request as a set of one or more tasks in a ledger, the one or more tasks being derived from the request;
use a crawler tool to find the data records appearing throughout the network in one or more data sources based on the set of one or more tasks;
query the one or more data sources to determine whether the one or more data sources are legitimate and whether the data records still exist on the one or more data sources;
determine if the privacy action will result in a disruption elsewhere in the network based on information associated with the data records and the one or more data sources;
perform the privacy action on the data records based on the set of the one or more tasks;
determine that the privacy action has been sufficiently completed based on a comparison of data corresponding to the set of one or more tasks and the found data records; and
report a performance of the privacy action to the ledger.

16. The non-transitory computer-readable medium of claim 15, wherein the privacy action includes one or more of accessing the data records obfuscating the data records, deleting the data records, and determining a risk of obfuscating or deleting the data records.

17. The non-transitory computer-readable medium of claim 15, wherein receiving the request includes receiving the request via one of a web-based computer, a kiosk, and an Interactive Voice Response (IVR) system.

18. The non-transitory computer-readable medium of claim 15, wherein the instructions for cause the processing device to accumulate information about the data records.

19. The non-transitory computer-readable medium of claim 15, wherein the instructions, when executed, further cause the processing device to determine whether the privacy action can be performed without causing an error elsewhere in the network before performing the privacy action.

20. The non-transitory computer-readable medium of claim 15, wherein the instructions, when executed, further cause the processing device to report a completion of the privacy action by determining whether an obfuscation or deletion process has been completed and presenting a certificate of destruction to the client in response to determining that the obfuscation or deletion process has indeed been completed.

* * * * *